United States Patent
N'Gum et al.

(10) Patent No.: US 9,170,921 B2
(45) Date of Patent: Oct. 27, 2015

(54) APPLICATION TESTING AUTOMATION

(71) Applicant: Bank of America Corporation, Charlotte, NC (US)

(72) Inventors: Bamba N'Gum, Charlotte, NC (US); Mona Shah, Charlotte, NC (US); Prashant Pandey, Andhra Pradesh (IN); Sudha Kiran Chakalakonda, Andhra Pradesh (IN); Seshadri N. Sundaram, Hitec (IN)

(73) Assignee: Bank of America Corporation, Charlotte, NC (US)

( * ) Notice: Subject to any disclaimer, the term of this patent is extended or adjusted under 35 U.S.C. 154(b) by 154 days.

(21) Appl. No.: 14/163,245

(22) Filed: Jan. 24, 2014

(65) Prior Publication Data
US 2015/0212927 A1    Jul. 30, 2015

(51) Int. Cl.
G06F 9/45      (2006.01)
G06F 11/36     (2006.01)

(52) U.S. Cl.
CPC ................................. *G06F 11/3664* (2013.01)

(58) Field of Classification Search
None
See application file for complete search history.

(56) References Cited

U.S. PATENT DOCUMENTS

| | | | |
|---|---|---|---|
| 6,587,969 B1* | 7/2003 | Weinberg et al. | 714/46 |
| 6,898,764 B2* | 5/2005 | Kemp | 715/762 |
| 8,489,930 B1* | 7/2013 | Sim-Tang | 714/38.1 |
| 8,881,109 B1* | 11/2014 | Bridges et al. | 717/125 |
| 9,038,029 B2* | 5/2015 | Chaturvedi et al. | 717/124 |
| 2003/0236775 A1* | 12/2003 | Patterson | 707/3 |
| 2006/0168565 A1* | 7/2006 | Gamma et al. | 717/122 |
| 2007/0033443 A1* | 2/2007 | Tillmann et al. | 714/45 |
| 2008/0256517 A1* | 10/2008 | Atkin et al. | 717/124 |
| 2008/0276225 A1* | 11/2008 | Saterdag et al. | 717/127 |
| 2008/0320462 A1* | 12/2008 | Bergman et al. | 717/168 |
| 2009/0210749 A1* | 8/2009 | Hayutin | 714/38 |
| 2009/0217303 A1* | 8/2009 | Grechanik et al. | 719/320 |
| 2009/0307650 A1* | 12/2009 | Saraf et al. | 717/101 |
| 2011/0016453 A1* | 1/2011 | Grechanik et al. | 717/125 |
| 2011/0090219 A1* | 4/2011 | Kruglick | 345/420 |
| 2011/0283267 A1* | 11/2011 | Waite et al. | 717/135 |
| 2011/0321013 A1* | 12/2011 | Raunstien | 717/125 |
| 2012/0159443 A1* | 6/2012 | Kamenz et al. | 717/124 |
| 2012/0173998 A1* | 7/2012 | Chaturvedi et al. | 715/762 |
| 2014/0108589 A1* | 4/2014 | Dhanda | 709/217 |
| 2014/0165043 A1* | 6/2014 | Pasala et al. | 717/124 |
| 2015/0082280 A1* | 3/2015 | Betak et al. | 717/124 |

OTHER PUBLICATIONS

Mercury Interactive Corporation, "QuickTest Professional User's Guide, Version 6.5", © 2003 Mercury Interactive Corporation, QTPUG6.5/01, www.mercuryinteractive.com.
Hewlett-Packard Development Company, L.P., "HP QuickTest Professional software, Data sheet", © 2007 Hewlett-Packard Development Company, L.P., 4AA1-2116ENW Rev. 1, www.hp.com/software, Oct. 2008.

* cited by examiner

*Primary Examiner* — Isaac T Tecklu
(74) *Attorney, Agent, or Firm* — Michael A. Springs

(57) ABSTRACT

According to one embodiment of the present invention, a test for an application is created. An application is identified with functionality applied through a graphical user interface. A determination is made of expected characteristics of an application object that will be included in a version of the application once the version of the application becomes available for testing through the graphical user interface. A virtual object is created according to the expected characteristics of the application object. A step associated with the virtual object is incorporated into a test case to be used on the version of the application. The test case that includes the virtual object is executed on the version of the application when the version of the application becomes available for testing through the graphical user interface.

20 Claims, 3 Drawing Sheets

APPLICATION TESTING AUTOMATION

TECHNICAL FIELD OF THE INVENTION

This invention relates, in general, to application testing and, more particularly, to automation of application testing.

BACKGROUND OF THE INVENTION

A software developer may create software applications that may incorporate any number of features and functionality depending on the requirements of the application. Some of these features may perform critical functions. Additionally, requirements for certain software features may change or be expanded at various times in a development schedule and/or over the life of the software application. Furthermore, such features may be needed under tight timing constraints.

SUMMARY OF THE INVENTION

In accordance with the present invention, disadvantages and problems associated with application testing may be reduced or eliminated.

According to one embodiment of the present invention, a test for an application is created. An application is identified with functionality applied through a graphical user interface. A determination is made of expected characteristics of an application object that will be included in a version of the application once the version of the application becomes available for testing through the graphical user interface. A virtual object is created according to the expected characteristics of the application object. A step associated with the virtual object is incorporated into a test case to be used on the version of the application. The test case that includes the virtual object is executed on the version of the application when the version of the application becomes available for testing through the graphical user interface.

Certain embodiments of the invention may provide one or more technical advantages. A technical advantage of an embodiment allows a test case to be created for an application with functionality applied through a graphical user without having the application available. The test case and/or automation scripts based on the test case may be ready for execution as soon as the application becomes available for testing. This may reduce the time allocated for testing of an application and, accordingly, the overall time required to release an application to general users. Another advantage of an embodiment allows a user who may have a non-technical background to create a test case and/or associated automation scripts that cover multiple testing scenarios easily through a graphical user interface. Such test cases and/or automation scripts may not require the user to author any computer code. Another technical advantage of an embodiment detects actions associated with a test case, automatically documents those test cases, and presents them on a user-friendly graphical user interface for relatively easy modification. Another technical advantage of an embodiment accommodates changes in underlying software applications without requiring substantial changes in the testing environment.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1:
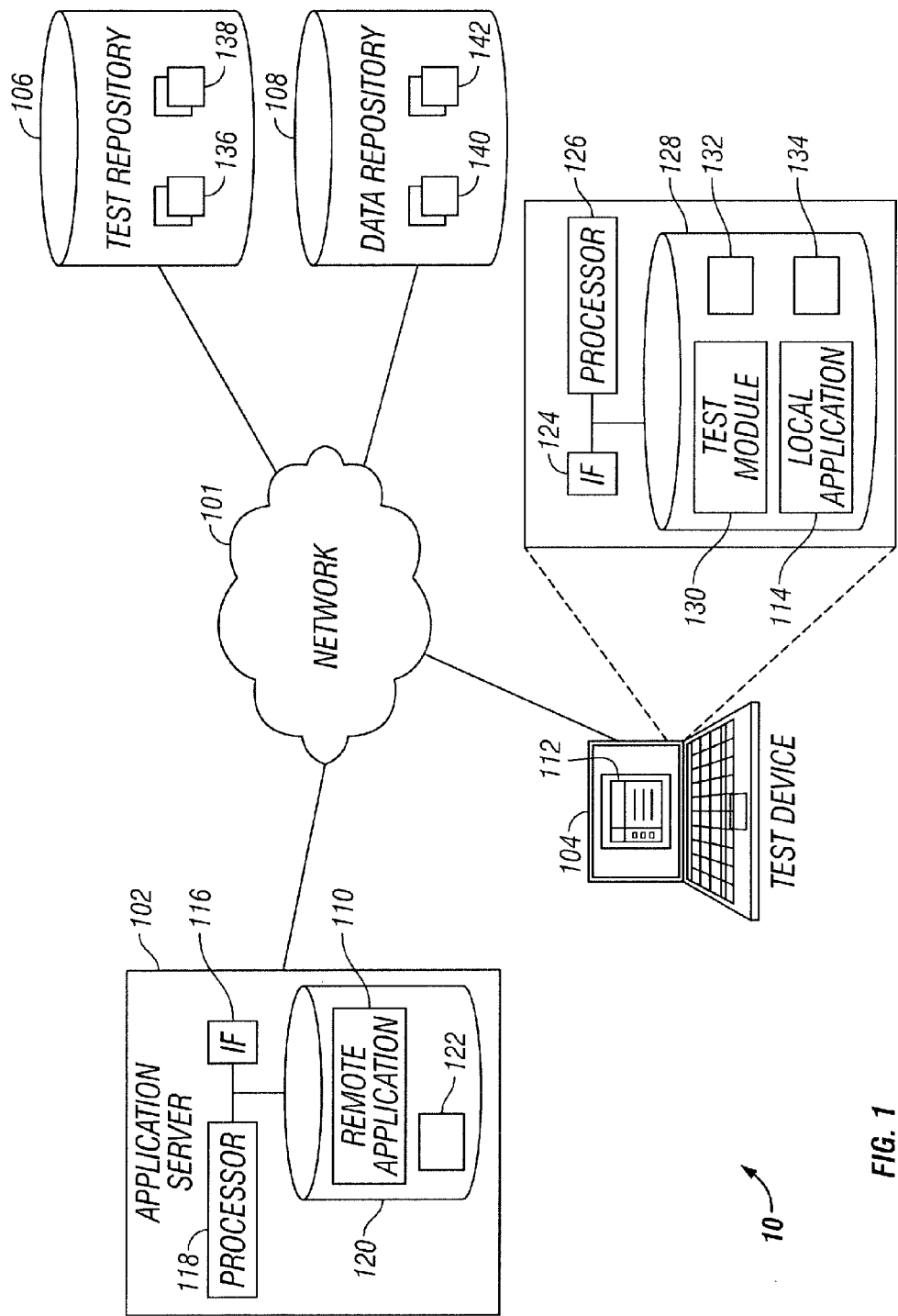
FIG. 1 illustrates an example system operable to test an application with functionality accessible through interaction with a graphical user interface.
Figure 2:
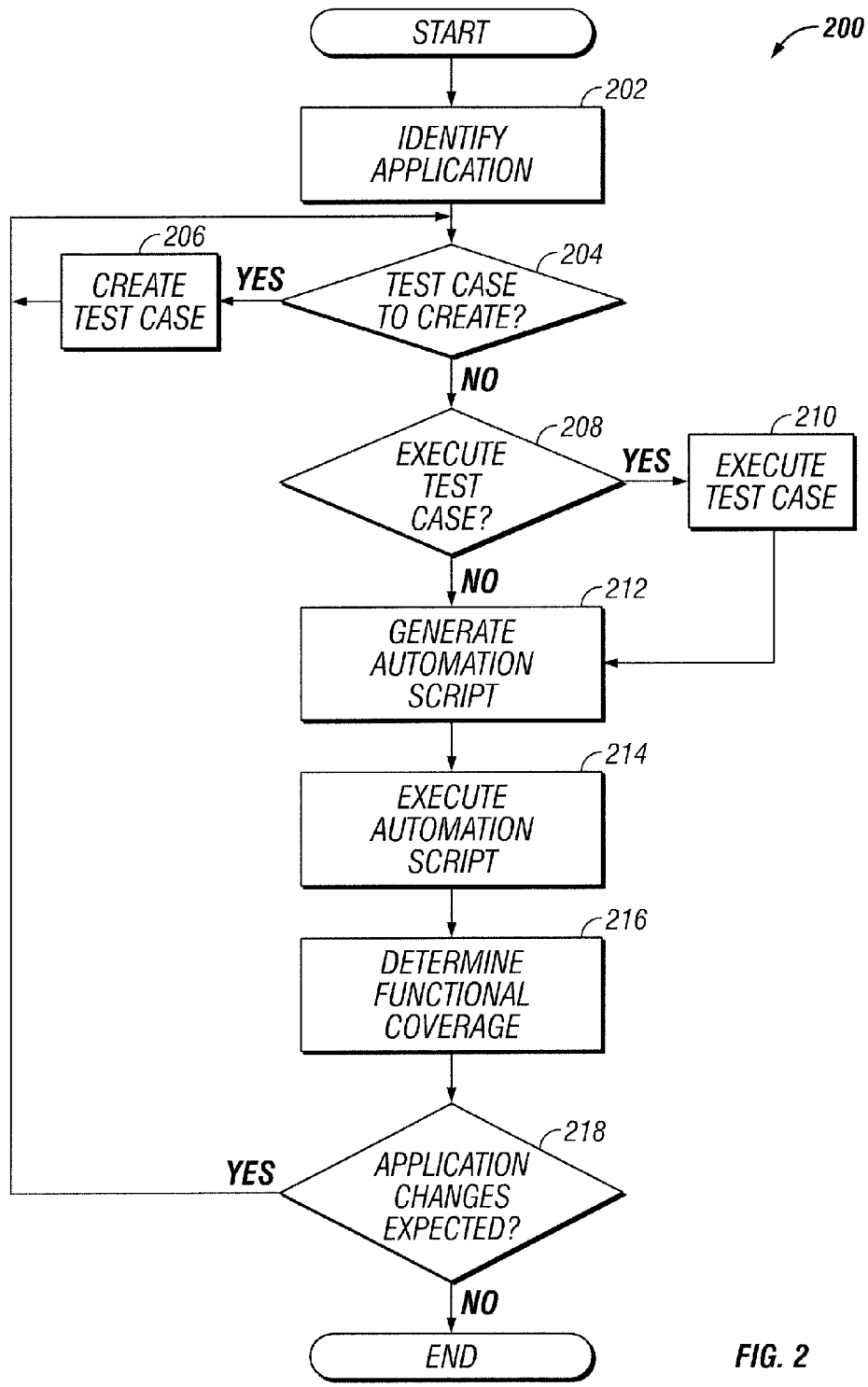
FIG. 2 illustrates an example method for testing an application.
Figure 3:
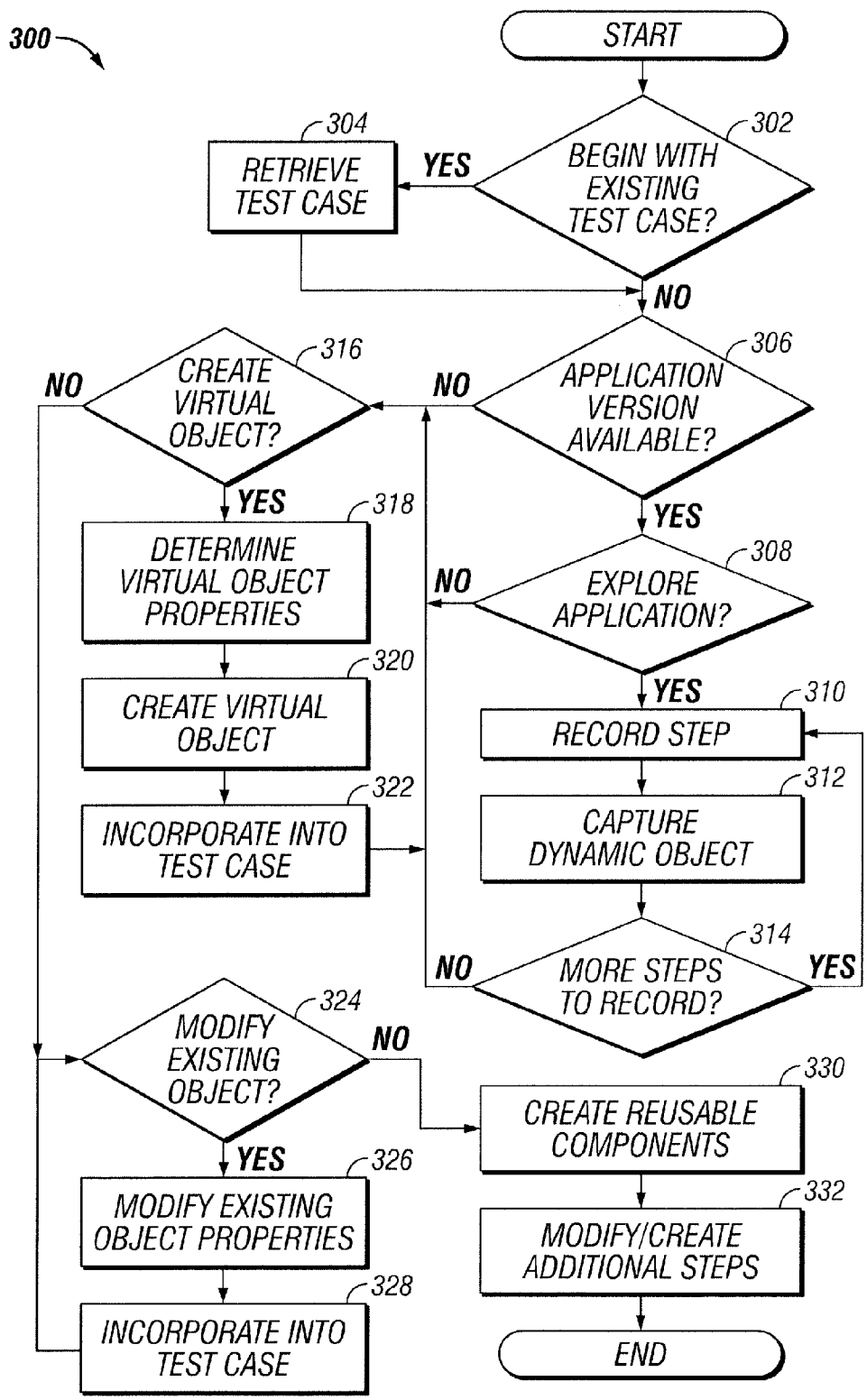
FIG. 3 illustrates an example flow chart for creating a test case.

Embodiments of the present invention and its advantages are best understood by referring to FIGS. 1 through 3, like numerals being used for like and corresponding parts of the various drawings.

FIG. 1 illustrates a system 10 operable to test an application with functionality accessible through interaction with a graphical user interface. System 10 includes an application server 102 that comprises a remote application 110. A test device 104 may be used to test functionality provided by remote application 110 through objects provided in a graphical user interface 112. In addition to testing the functionality of remote application 110, system 10 may also test the functionality of the objects of graphical user interface 112 themselves (e.g., determining whether an object of graphical user interface 112 is associated with an appropriate function of remote application 110). In certain embodiments, test device 104 test device 104 may be used to test a local application 114 installed on test device 104. Test device 104 may retrieve various test cases and/or test scripts stored in a test repository 106 to execute on remote application 110 and/or local application 114. Data repository 108 may include data accessed when test device 104 executes test cases. Test device 104 may also store the results of the executed test cases in data repository 108.

Certain embodiments of system 10 are operable to create test cases for a version of application 110 and/or 114 when those applications are not available for testing, such as prior to the creation of new versions of the application 110 and/or 114. For example, system 10 may operate to detect and record steps taken by a user of test device 104 on graphical user interface 112 in order to create a test case for testing the functionality of remote application 110 and/or local application 114. The recorded steps may then be incorporated into an automated test script that may be used to execute the test case with various data inputs as provided by data repository 108. After recording the user's initial actions to create a test case, however, subsequent versions of applications 110 and/or 114 may be created.

System 10 may allow creation and/or modification of a test case with the expected characteristics of the objects to be provided in new versions of application 110 and/or application 114 through use of virtual objects that incorporate the behavior of any new objects that will be included in the subsequent versions of the application 110 and/or 114. As such, a test case that relies on user interaction with controls on graphical user interface 112 may be ready for execution on application 110 and/or application 114 as soon as the new versions of the applications become available and without requiring a user of test device 104 to manually perform the test steps through graphical user interface 112. Removing the requirement of manually recording a user's test steps once an application becomes available may reduce the overall time needed to prepare and execute any test cases and/or automation test scripts on newer versions of applications 110 and/or 114.

A network 101 represents any suitable network that facilitates communication between the components of system 10. For example, instructions invoked through controls on graphical user interface 112 may be communicated from test device 112 to application server 102 via network 101. Network 101 may include any interconnecting system capable of transmitting audio, video, signals, data, messages, or any combination of the preceding. Network 101 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, any other suitable communication link, including combinations thereof operable to facilitate communication between the components of system 10.

Application server 102 may include a network server, any suitable remote server, a mainframe, a host computer, a workstation, a web server, a personal computer, a file, server, or any other suitable device operable to perform the functions of remote application 110. In some embodiments, application server 102 may execute any suitable operating system such as IBM's zSeries/Operating system (z/OS), MS-DOS, PC-DOS, MAC-OS, WINDOWS, UNIX, OPenVMS, Linux, or any other appropriate operating systems, including operating systems developed in the future. The functions of application server 102 may be performed by any suitable combination of one or more servers or other components at one or more locations. In the embodiment where the modules are servers, the servers may be public or private servers, and each server may be a virtual or physical server. The server may include one or more servers at the same or at locations remote from one another.

In certain embodiments, application server 102 includes a network interface 116, a processor 118, and a memory 120.

Network interface 116 represents any suitable device operable to receive information from network 101, perform suitable processing of the information, communicate to other devices, or any combination of the preceding. For example, network interface 116 may receive a request to execute a function associated with an object invoked on graphical user interface 112. Network interface 116 represents any port or connection, real or virtual, including any suitable hardware and/or software, including protocol conversion and data processing capabilities, to communicate through a LAN, WAN, or other communication systems that allows application server 102 to exchange information with the other components of system 10.

Memory 120 stores, either permanently or temporarily, data, operational software, or other information for processor 118. Memory 120 includes any one or a combination of volatile or nonvolatile local or remote devices suitable for storing information. For example, memory 120 may include random access memory (RAM), read only memory (ROM), magnetic storage devices, optical storage devices, or any other suitable information storage device or a combination of these devices. While illustrated as including particular modules, memory 120 may include any suitable information for use in the operation of application server 102.

In certain embodiments, memory 120 includes remote application 110 and management data 122. Remote application 110 represents any suitable set of instructions, logic, or code embodied in a non-transitory, computer readable medium and operable to execute functions invoked through interaction with objects on graphical user interface 112. By way of example only, remote application 110 may be associated with a bank and be operable to access information associated with accounts managed by the bank, transfer funds among those accounts or with accounts at different organizations, invoke bill payment features, check the status of issue tickets submitted by patrons of the bank, facilitate vendor management related functions, carry out functions required by government regulations, any other suitable function, and/or any suitable combination of the preceding. When released for use, remote application 110 may be used by employees of an entity as well as customers, vendors, partners, and/or any other suitable user, where appropriate. Particular embodiments of system 10 facilitate testing of functionality associated with any objects in graphical user interface 112 used to invoke operations in remote application 110 prior to release to such users.

Remote application 110 may reference information stored in management data 122. Management data 122 includes any rules or data used by remote application 110 in carrying out its functions. For example, management data 122 includes rules that indicate what operation or combination of operations corresponds to a particular action associated with an object on graphical user interface 112. In certain embodiments, remote application 110 may access rules or data residing in non-local repositories, such as test repository 106, data repository 108, and/or any other suitable repository instead of and/or in addition to information stored in management data 122.

Processor 118 communicatively couples to network interface 116 and memory 120. Processor 118 controls the operation and administration of application server 102 by processing information received from network interface 116 and memory 120. Processor 118 includes any hardware and/or software that operates to control and process information. For example, processor 118 executes remote application 110 to control the operation of application server 102. Processor 118 may be a programmable logic device, a microcontroller, a microprocessor, any suitable processing device, or any suitable combination of the preceding.

Test device 104 may comprise any type of mobile or stationary computing device operable to allow a user to interact with objects on graphical user interface 112. Examples of test device 104 include a mobile phone, personal digital assistant, laptop, netbook, ultrabook, tablet, desktop computer, cable box, television, and/or any other suitable device. As will be explained in more detail below, interaction with objects on graphical user interface may invoke functionality in remote application 110, local application 114, and/or test module 130, where appropriate. Certain embodiments of test device 104 comprise, along with graphical user interface 112, a network interface 124, a processor 126, and a memory 128.

Graphical user interface or GUI 112 comprises objects that invoke functionality within applications 110 and/or 114 in response to actions taken on those objects by a user of test device 104. Graphical user interface 112 is generally operable to tailor and filter data entered by and presented to the user. Graphical user interface 112 may provide the user with an efficient and user-friendly presentation of information. Objects within graphical user interface 112 may be arranged to facilitate the display of information and possible choices related to the underlying purpose of applications 110 and/or 114. For example, if graphical user interface 112 is associated with a banking application, graphical user interface 112 may operate to allow a user to select from among the accounts owned by a bank patron in a "list" object. The user may then click a submit "button" object on graphical user interface 112 to instruct application 110 and/or 114 to retrieve information on the selected account. The retrieved information may be displayed to the user of test device 104 in a "label" or "text field" object on graphical user interface 112. Other non-limiting examples of objects that may be included on graphical user interface 112 are a "check box," "radio button," "toggle button," "slider," "combo box," "password field," "text area," and "table." Non-limiting actions that may invoke functionality in applications 110 and/or 114 include clicking, toggling, and hovering with any suitable input device, such as a mouse, stylus, or finger.

Some objects within graphical user interface 112 may be dynamic objects such that they appear in response to a triggering condition. For example, a list object may be dynamic if it appears only after a user has selected an appropriate check box object. As another example, a dynamic list object may include or display different items based on a particular selection of options on other objects.

Graphical user interface 112 may include multiple levels of abstraction including groupings, containers, and boundaries, each of which may be regarded as objects. It should be understood that the term graphical user interface may be used in the singular or in the plural to describe one or more graphical user interfaces and each of the displays of a particular graphical user interface 112.

For example, in certain embodiments of system 10, graphical user interface 112 comprises objects associated with test module 130. Such objects may include a button that, when clicked, starts/stops recording of actions taken on objects of graphical user interface 112. The detected actions may become a test case. When recording ceases, a set of automation scripts may be automatically created that will execute the test case over multiple scenarios, such as with each of a set of account numbers or other suitable one or more variables. Graphical user interface 112 may also allow a user of test device 104 or other suitable device to modify test cases by rearranging the order of actions that will be taken on certain objects. In particular embodiments, a user of test device 104 may create a virtual object, specify certain actions to be taken with respect to the virtual object, and incorporate those actions into a test case.

In particular embodiments, graphical user interface 112 may be displayed to a user using a web browser that allows a user of test device 104 to interact with a website, hosted by application server 102, for example, by transmitting information to and receiving information from the website. Suitable web browsers may include Microsoft Internet Explorer®, Mozilla Firefox®, Google Chrome™, Apple Safari™, or Opera®.

Portions of graphical user interface 112 that will be associated with new versions of applications 110 and/or 114 may be unavailable during test case creation. As such, test cases may be created and/or updated through creation of virtual objects as described in more detail below.

Network interface 124 represents any suitable device operable to receive information from network 101, perform suitable processing of the information, communicate to other devices, or any combination of the preceding. For example, network interface 124 may communicate a request to execute a function associated with an object invoked on graphical user interface 112 to application server 102. Network interface 124 represents any port or connection, real or virtual, including any suitable hardware and/or software, including protocol conversion and data processing capabilities, to communicate through a LAN, WAN, or other communication systems that allows test device 104 to exchange information with the other components of system 10.

Memory 128 stores, either permanently or temporarily, data, operational software, or other information for processor 126. Memory 128 includes any one or a combination of volatile or nonvolatile local or remote devices suitable for storing information. For example, memory 128 may include random access memory (RAM), read only memory (ROM), magnetic storage devices, optical storage devices, or any other suitable information storage device or a combination of these devices. While illustrated as including particular modules, memory 128 may include any suitable information for use in the operation of test device 104.

Memory 128 may include any suitable software to carry out the functions of test device 104. For example, test device 104 may include web browsing software and may incorporate any suitable operating system such as WINDOWS, MAC-OS, UNIX, LINUX, iOS, Windows Mobile, Android, and/or any other suitable operating system. In certain embodiments, memory 128 includes local application 114, management data 134, test module 130, and test data 132.

Local application 114 represents any suitable set of instructions, logic, or code embodied in a non-transitory, computer readable medium and operable to execute functions invoked through interaction with objects on graphical user interface 112. Local application 114 may comprise any suitable application, such as any of those described above with respect to remote application 110. When released for use, local application 114 may be used by employees of an entity as well as customers, vendors, partners, and/or any other suitable user, where appropriate. Particular embodiments of system 10 facilitate testing of functionality associated with any objects in graphical user interface 112 used to invoke operations in local application 114 prior to release to such users.

Local application 114 may reference information stored in management data 134. Management data 134 includes any rules or data used by local application 114 in carrying out its functions. For example, management data 134 includes rules that indicate what operation or combination of operations corresponds to a particular action associated with an object on graphical user interface 112. In certain embodiments, local application 114 may access rules or data residing in non-local repositories, such as test repository 106, data repository 108, and/or any other suitable repository instead of and/or in addition to information stored in management data 134.

Test module 130 represents any suitable set of instructions, logic, or code embodied in a non-transitory, computer readable medium and operable to create, execute, and automate testing of applications 110 and/or 114 through interaction with objects of graphical user interface 112.

Test module 130 may reference information stored in test data 132. Test data 132 includes any rules or data used by test module 130 in carrying out its functions. For example, test data 132 includes rules that indicate what operation or combination of operations corresponds to a particular action associated with an object on graphical user interface 112. In certain embodiments, test module 130 may access rules or data residing in non-local repositories, such as test repository 106, data repository 108, and/or any other suitable repository instead of and/or in addition to information stored in test data 132.

Test module 130 may have any suitable features to carry out its functions. For example, test module 130 may include an exploration feature that allows creation of a test case by detecting a user's actions on one or more objects in graphical user interface 112. During exploration, test module 130 may also detect objects within graphical user interface 112 that are not interacted with by a user of test device 104 as well as the properties of such objects, such as the various options available within a list object. For example, dynamic objects may be detected during exploration in certain embodiments, along with characteristics associated with those dynamic objects. Test module 130 may keep a record of objects, including dynamic objects, that have not been interacted with and/or with options that have not been exercised. This may be provided in a notification to a user of test device 104.

Once explored, test module 130 may document the actions detected in a user-friendly way, such that a user of test device 104, for example, may understand them if presented in a window of graphical user interface 112 (e.g., "Click Transfer Button"). Test module 130 also may facilitate insertion of test checks at different points within a test. For example, a test check may determine whether a value shown in a label object after clicking a submit button object matches an expected value. The test case may be stored in test data 132, test repository 106, and/or any other suitable storage media, for retrieval when the test case will be executed.

Test module 130 may include features for creating a test case without using an exploration feature and/or when the version of the application to be tested is unavailable. In certain embodiments, this may be carried out by modifying the characteristics of an existing object detected during a previous exploration and/or modifying the actions taken on that object in the test case. Additionally, test module 130 may be used to a create a virtual object that emulates the expected characteristics of an object of an application once it becomes available. The test case may then incorporate actions associated with that virtual object as part of its test sequence. In particular embodiments, test module 130 may create test cases without or substantially without any exploration features by using virtual objects. Test checks may be inserted into the test case based on the modified existing objects and the newly added virtual objects. As such, test module 130 may create test cases based on exploration, modification of existing objects, modification of actions taken with existing objections, creation of virtual objects, addition of actions associated with virtual objects, and/or any suitable combination of the preceding.

Test module 130 may include any suitable features for managing and editing such test cases. For example, test module 130 may allow reordering of the sequence of the actions in a test case to any other suitable order. Additionally, actions on objects may be added or removed. As another option, a group of steps may be identified as a reusable component. A reusable component comprises one or more actions associated with particular objects, which may include virtual objects. Once identified, a reusable component may be used at multiple points within a test case and/or in other test cases.

Test module 130 may execute test cases piecemeal, which will exercise objects in graphical user interface 112 in the manner and order dictated by the steps of the test case. The test checks will verify whether particular functions work appropriately in application 110 and/or 114, when invoked through graphical user interface 112. Test module 130 may be configured to log the results of the test checks and/or any errors/exceptions encountered during test case execution. These results may be stored locally and/or in a non-local repository such as data repository 108 for subsequent analysis by a user of test device 104, for example.

Test module 130 may also create and execute automation scripts based on the test cases. For example, an automation scripts may be configured to execute a test case based on a different scenarios, such as with each of a set of account numbers that could be entered into a text field object of graphical user interface 112. The input data sets, such as a set of account numbers, may be retrieved from local storage in memory 128 or retrieved from non-local repository, such as data repository 108. The input data sets may also include expected values for each of the test checks. As one non-limiting example, the input data sets may be stored in tabular format. Each row of the data set may correspond to a unique iteration of the test case. The automation scripts may cause the results of the test checks for each iteration of the test case to be stored locally and/or in data repository 108. Additionally, in certain embodiments, automation scripts may aggregate and execute several unique test cases over one or more applications 110 and/or 114.

In certain embodiments, test module 130 may facilitate determining the amount of functional coverage that a particular set of test cases achieves for application 110 and/or 114. This may involve analyzing the test cases and/or the automation scripts related to these test cases to determine the affected objects and the actions associated with those objects. Test module 130 may also analyze all or a portion of the objects and possible properties for each of those objects in graphical user interface 112 and/or application 110/114, which may be detected during exploration, inserted based on expectations of a version of an application that is not available, and/or any suitable combination of the preceding. Test module 130 may then compare these two sets of information to determine how much coverage one or more sets of test cases achieves over all the functionality possible in application 110 and/or 114.

Processor 126 communicatively couples to network interface 126 and memory 128. Processor 126 controls the operation and administration of test device 104 by processing information received from network interface 126 and memory 128. Processor 126 includes any hardware and/or software that operates to control and process information. For example, processor 126 executes local application 114 and any other software to control the operation of test device 104. Processor 126 may be a programmable logic device, a microcontroller, a microprocessor, any suitable processing device, or any suitable combination of the preceding.

Test repository 106 and data repository 108 store, either permanently or temporarily, data or other information for use by any of the components of system 10. Test repository 106 and data repository 108 include any one or a combination of volatile or nonvolatile local or remote devices suitable for storing information. For example, test repository 106 and data repository 108 may include random access memory (RAM), read only memory (ROM), magnetic storage devices, optical storage devices, or any other suitable information storage device or a combination of these devices. While illustrated as including particular modules, test repository 106 and data repository 108 may include any suitable information for use in the operation of system 10. For example, test repository 106 and data repository 108 may incorporate network interfaces similar to network interface 116 and/or 124, where appropriate, to facilitate transfer of information over network 101. Test repository 106 and data repository 108 may incorporate processors similar to processor 118 and/or 126, where appropriate, to facilitate storage and retrieval of information stored on each respective storage medium.

In particular embodiments, test repository 106 includes test cases 136 and automation scripts 138. Test module 130 may store and retrieve test cases 136, as needed throughout its operation. Test cases 136 also may be referenced by automation scripts 138. Automation scripts 138 aggregate test cases 136 and include instructions for allowing test module 130 to apply test cases 136 over one or more input data sets 140 stored in data repository 140. Input data set 140 may be created, for example, by a user of test device 140. Alternatively, test module 130 may create an input data set 140 by analyzing information stored in separate database. For example, each row of an input data set may correspond to an account identifier extracted from the separate database. Test module 130 may store the results of executing test cases 136 and/or automation scripts 138 in results data 142.

In an exemplary embodiment of operation of system 10, an initial version of a remote application 110 is available on application server 102. Test module 130 initiates an exploration feature that detects objects and actions related to those objects within graphical user interface 112. Test module 130 stores the detected actions as test case 136. The next release of remote application 110 will include a new object that did not exist during the original exploration of remote application 110 through graphical user interface 112. Test module 130 facilitates incorporation of actions related to the new object into the test case by creating a virtual object. For example, a user of test device 104 provides characteristics (e.g., object type, etc.) associated with the new object and one or more actions related the new object. The user also adds test checks associated with the new object. The virtual object and associated actions are incorporated into a test case 136, such that it includes actions provided using the exploration feature of test module 130 along with actions entered directly related to the virtual object. Test module 130 creates an automation script 138 that references test case 136. Automation script 138 includes instructions for iterating test case 136 over an input data set 140. The next release of remote application becomes available on remote application 110. Test module 130 executes automation script 138 on remote application 110 via graphical user interface 112. The results of the test are stored in results data 142.

A component of system 10 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, test module 130 may facilitate creation of a test case 136 through use of virtual objects alone without using any exploration features. Test case 136 and/or automation script 138 may be executed through graphical user interface 112 for testing under realistic conditions. As another example, system 10 may incorporate two or more test devices 104. In such an embodiment, multiple devices 104 may be used to execute portions of automation scripts 136 and/or to create different portions of a test case as one or more reusable components. In such embodiments, execution of automation scripts 136 may be completed more quickly than with a single test device 104.

Additionally, the components of system 10 may be integrated or separated. For example, test repository 106 and data repository 108 may be combined into a single repository. In certain embodiments, all or a portion of repositories 106 and/or 108 may be incorporated directly into test device 104.

FIG. 2 illustrates an example method 200 for testing an application. The method begins at step 202, where an application is identified for testing. This may involve receiving input from a user through a graphical user interface. At step 204, the method determines whether a test case will be created. If so a test case is created at step 206. An example embodiment of creating a test case will be described below with respect to FIG. 3. If no test case is created at step 204, the method determines whether a test case will be executed. If so, the test case is executed at step 210. A test case may be executed at step 210 outside of an automation script to debug the test case, debug an application, and/or for any other suitable purpose. At step 212, an automation test script is created based on one or more test cases. The automation test script may include instructions for iterating the test case over one or more input data sets. The automation test script may also include instructions for reporting and/or storing the results of test case execution. At step 216, the method determines functional coverage for a test case and/or an automation test script. This may be reported, for example, in terms of a percentage of functionality tested in relation to the total amount of functionality available in an application. At step 218, the method determines whether any application changes are expected. If so, the method may return to step 204, where the method may determine that another test case will be created. If not, the method may end.

Modifications, additions, or omissions may be made to method 200 disclosed herein without departing from the scope of the invention. The method may include more, fewer, or other steps. For example, at step 206, an existing test case may be modified instead of and/or in addition to a new test being created. In certain embodiments, an automation script may not need to be generated at step 212. This may occur, for example, when only one instance of a test case will be executed at step 210. Additionally, an automation script may already exist that points to an identifier for a test case. In such a case, the underlying test case may be changed as needed without requiring generation and/or changes to an automation script at step 212. Additionally, steps may be performed in parallel or in any suitable order. For example, the functional coverage may be determined in step 216 prior to execution of an automation script in step 214.

FIG. 3 illustrates an example method 300 for creating a test case. The method begins at step 302, where the method determines whether to start from an existing test case. If so, the method retrieves the existing test case at step 304. The existing test case may be retrieved from test repository 106, for example. At step 306, the method determines whether the version of the application to be tested is available. If the version of the application to be tested is available, the method determines whether any exploration of the application should be performed at step 308. If so, the method detects an action performed an object in a graphical user interface associated with the application at step 310. At step 312, the method may detect dynamic objects of the application. During this step, objects that appear only in response to certain conditions may be detected. The method also may detect an object and properties associated with such object that are not interacted with or selected during exploration. The method determines whether more steps and/or dynamic objects should be detected at step 314. If so, the method returns to step 310. If not, the method continues to step 316. Note that the method may have continued to step 316 if the version of the application to be tested was not available and/or if exploration of the application was not to be performed.

At step 316, the method determines whether any virtual objects will be created. If so, the method determines the properties of the virtual object at step 318. This step may involve receiving input from a user of test device 104, for example. The virtual object is created in step 320. At step 322, the method incorporates the virtual object into the test case. This may involve specifying actions to be taken on the virtual object during test case and/or automation script execution. This may also involve inserting test checks related to the virtual object. The method determines whether any additional virtual objects are to be created at step 316. If not, the method continues to step 324.

At step 324, the method determines whether an existing object and/or actions taken on existing object will be modified. If so, existing object properties may be modified at step 326. The object may be incorporated into the test case at step 328. This may involve specifying actions to be taken on the object during test case and/or automation script execution. This may also involve inserting and/or modifying test checks related to the object. The method determines whether any additional modifications to additional existing objects and/or actions on other existing object at step 324. If not, the method continues to step 330 where reusable components may be created. During step 330, sequences of actions and/or steps related to one or more objects may be grouped together as a unit. The method may insert reusable components at any suitable number of points in the test case at step 332. At step 332, the method may also modify, create, and/or reorder any steps in the test case, where appropriate. Then, the method may end.

Modifications, additions, or omissions may be made to method 300 disclosed herein without departing from the scope of the invention. The method may include more, fewer, or other steps. For example, certain embodiments of method 300 may exclude step 312, such that dynamic objects may be not be detected during exploration unless such objects are interacted with directly by a user. As another example, method 300 may include an additional step whereby a user, such as a user of test device 104, is provided a notification that certain objects detected during exploration are dynamic objects that may or may not have hidden options. The notification may also indicate that certain objects have not been interacted with during exploration. The notification, as one non-limiting example, may be in the form of a graphical alert on a graphical user interface that appears during and/or after an application exploration. As another example, the notification may appear in a log file.

Additionally, steps may be performed in parallel or in any suitable order. For example, an existing test case may be retrieved at step 304 and incorporated into a new test case after the exploration steps 308-314.

Certain embodiments of the invention may provide one or more technical advantages. A technical advantage of an embodiment allows a test case to be created for an application with functionality applied through a graphical user without having the application available. The test case and/or automation scripts based on the test case may be ready for execution as soon as the application becomes available for testing. This may reduce the time allocated for testing of an application and, accordingly, the overall time required to release an application to general users. Another advantage of an embodiment allows a user who may have a non-technical background to create a test case and/or associated automation scripts that cover multiple testing scenarios easily through a graphical user interface. Such test cases and/or automation scripts may not require the user to author any computer code. Another technical advantage of an embodiment detects actions associated with a test case, automatically documents those test cases, and presents them on a user-friendly graphical user interface for relatively easy modification. Another technical advantage of an embodiment accommodates changes in underlying software applications without requiring substantial changes in the testing environment.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A device for testing an application, comprising:
    a memory comprising rules for testing an application with functionality applied through a graphical user interface; and
    a processor communicatively coupled to the memory and operable to:
        identify the application with functionality applied through the graphical user interface;
        determine expected characteristics of an application object that will be included in a version of the application once the version of the application becomes available for testing through the graphical user interface;
        create a virtual object according to the expected characteristics of the application object;
        incorporate the virtual object and a step associated with the virtual object into a test case to be used on the version of the application; and
        execute the test case that includes the virtual object and the step associated with the virtual object on the version of the application when the version of the application becomes available for testing through the graphical user interface.

2. The device of claim 1, wherein the processor is further operable to:
    execute a prior version of the application that is available for testing through the graphical user interface;
    detect a step taken within a graphical user interface associated with the prior version of the application; and
    incorporate the detected step into the test case such that the test case includes the detected step and the step associated with the virtual object.

3. The device of claim 1, wherein the processor is further operable to generate an automation test script that includes the test case with the virtual object prior to when the version of the application becomes available for testing through the graphical user interface.

4. The device of claim 1, wherein the processor is further operable to:
    execute a different version of the application that is available for testing through the graphical user interface; and
    during execution of the different version of the application, identify a dynamic object within the application without detecting an interactive action taken on the dynamic object.

5. The method of claim 1, wherein the processor is further operable to:
    identify an existing object in the test case distinct from the virtual object;
    modify the existing object according to expected characteristics of an additional application object; and
    incorporate the modified object into the test case without executing the application, such that the test case includes the existing object and the virtual object.

6. The device of claim 1, wherein the processor is further operable to determine a value for functional coverage associated with the test case.

7. The device of claim 1, wherein the processor is further operable to designate one or more steps in the test case as a reusable component.

8. A method for testing an application comprising:
identifying an application with functionality applied through a graphical user interface;
determining expected characteristics of an application object that will be included in a version of the application once the version of the application becomes available for testing through the graphical user interface;
creating, using a processor, a virtual object according to the expected characteristics of the application object;
incorporating, using the processor, and the virtual object and a step associated with the virtual object into a test case to be used on the version of the application; and
executing, using the processor, the test case that includes and the step associated with the virtual object the virtual object on the version of the application when the version of the application becomes available for testing through the graphical user interface.

9. The method of claim 8, further comprising:
executing a prior version of the application that is available for testing through the graphical user interface;
detecting a step taken within a graphical user interface associated with the prior version of the application; and
incorporating the detected step into the test case such that the test case includes the detected step and the step associated with the virtual object.

10. The method of claim 8, further comprising generating an automation test script that includes the test case with the virtual object prior to when the version of the application becomes available for testing through the graphical user interface.

11. The method of claim 8, further comprising:
executing a different version of the application that is available for testing through the graphical user interface; and
during execution of the different version of the application, identifying a dynamic object within the application without detecting an interactive action taken on the dynamic object.

12. The method of claim 8, further comprising:
identifying an existing object in the test case distinct from the virtual object;
modifying the existing object according to expected characteristics of an additional application object; and
incorporating the modified object into the test case without executing the application, such that the test case includes the existing object and the virtual object.

13. The method of claim 8, further comprising determining a value for functional coverage associated with the test case.

14. The method of claim 8, further comprising designating one or more steps in the test case as a reusable component.

15. A non-transitory computer readable medium comprising logic, the logic when executed by a processor, operable to:
identify an application with functionality applied through a graphical user interface;
determine expected characteristics of an application object that will be included in a version of the application once the version of the application becomes available for testing through the graphical user interface;
create a virtual object according to the expected characteristics of the application object;
incorporate the virtual object and a step associated with the virtual object into a test case to be used on the version of the application; and
execute the test case that includes and the step associated with the virtual object the virtual object on the version of the application when the version of the application becomes available for testing through the graphical user interface.

16. The non-transitory computer readable medium of claim 15, wherein the logic is further operable to:
execute a prior version of the application that is available for testing through the graphical user interface;
detect a step taken within a graphical user interface associated with the prior version of the application; and
incorporate the detected step into the test case such that the test case includes the detected step and the step associated with the virtual object.

17. The non-transitory computer readable medium of claim 15, wherein the logic is further operable to generate an automation test script that includes the test case with the virtual object prior to when the version of the application becomes available for testing through the graphical user interface.

18. The non-transitory computer readable medium of claim 15, wherein the logic is further operable to:
execute a different version of the application that is available for testing through the graphical user interface; and
during execution of the different version of the application, identify a dynamic object within the application without detecting an interactive action taken on the dynamic object.

19. The non-transitory computer readable medium of claim 15, wherein the logic is further operable to:
identify an existing object in the test case distinct from the virtual object;
modify the existing object according to expected characteristics of an additional application object; and
incorporate the modified object into the test case without executing the application, such that the test case includes the existing object and the virtual object.

20. The non-transitory computer readable medium of claim 15, wherein the logic is further operable to designate one or more steps in the test case as a reusable component.

* * * * *